No. 841,038. PATENTED JAN. 8, 1907.
A. & J. H. McLEOD.
AUTOMATIC WEIGHER.
APPLICATION FILED APR. 28, 1906.

6 SHEETS—SHEET 1.

WITNESSES
D. C. Wilson
Amos W. Hart

INVENTORS
Angus McLeod
John H McLeod
BY
Munn & Co.
ATTORNEYS

No. 841,038. PATENTED JAN. 8, 1907.
A. & J. H. McLEOD.
AUTOMATIC WEIGHER.
APPLICATION FILED APR. 28, 1906.

6 SHEETS—SHEET 4.

WITNESSES
D. E. Wilson
Amos W. Hart

INVENTORS
Angus McLeod
John H. McLeod
BY
Munn & Co.
ATTORNEYS

No. 841,038. PATENTED JAN. 8, 1907.
A. & J. H. McLEOD.
AUTOMATIC WEIGHER.
APPLICATION FILED APR. 28, 1906.

6 SHEETS—SHEET 5.

WITNESSES
D. C. Wilson
Ann W. Hart

INVENTORS
Angus McLeod
John H. McLeod
BY Munn & Co
ATTORNEYS

No. 841,038. PATENTED JAN. 8, 1907.
A. & J. H. McLEOD.
AUTOMATIC WEIGHER.
APPLICATION FILED APR. 28, 1906.
6 SHEETS—SHEET 6.
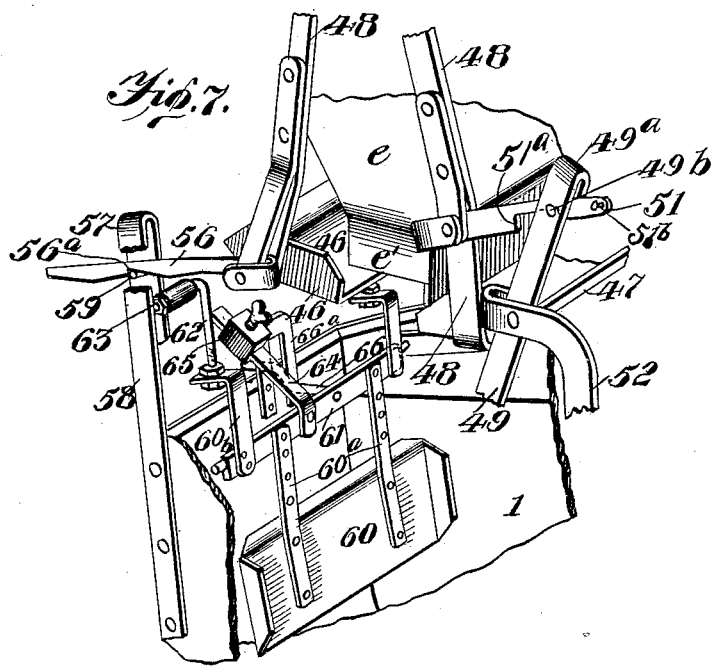
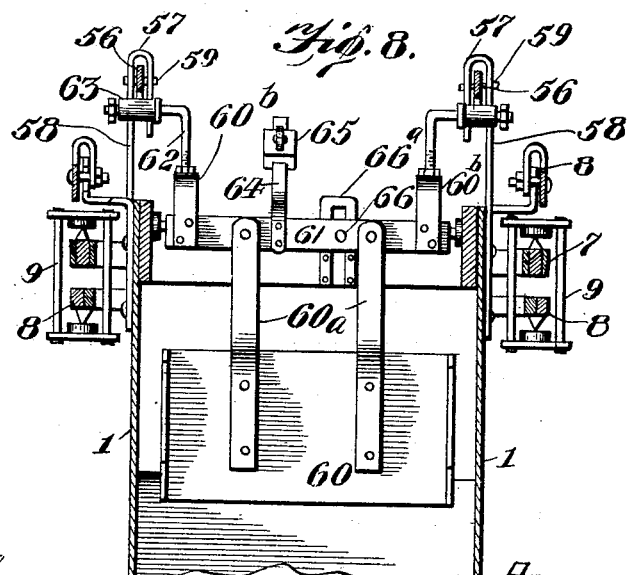
WITNESSES
D. E. Wilson
Anna W. Hart
INVENTORS
Angus McLeod
John H. McLeod
BY Munn & Co.
ATTORNEYS

UNITED STATES PATENT OFFICE.

ANGUS McLEOD AND JOHN H. McLEOD, OF MARIETTA, KANSAS.

AUTOMATIC WEIGHER.

No. 841,038.　　　　Specification of Letters Patent.　　　　Patented Jan. 8, 1907.

Application filed April 28, 1906. Serial No. 314,288.

*To all whom it may concern:*

Be it known that we, ANGUS McLEOD and JOHN H. McLEOD, citizens of the United States, residing at Marietta, in the county of Marshall and State of Kansas, have invented an Improvement in Automatic Weighers, of which the following is a specification.

Our invention is an improvement upon the automatic grain-weigher for which we have received Letters Patent No. 706,442.

In the present invention, as in the former one, the grain is received into a stationary hopper and discharged therefrom into a movable weighing-hopper which is so connected with weighing and other mechanism that when filled it tilts automatically and the weight is duly recorded or registered, the hopper being then automatically restored to its first position, whereupon it receives another charge of grain and tilts and discharges as before.

Our present invention comprises improvements in several features, as will be hereinafter described, the details of construction, arrangement, and operation being as hereinafter set forth, and illustrated in the accompanying drawings, in which—

Figure 1:
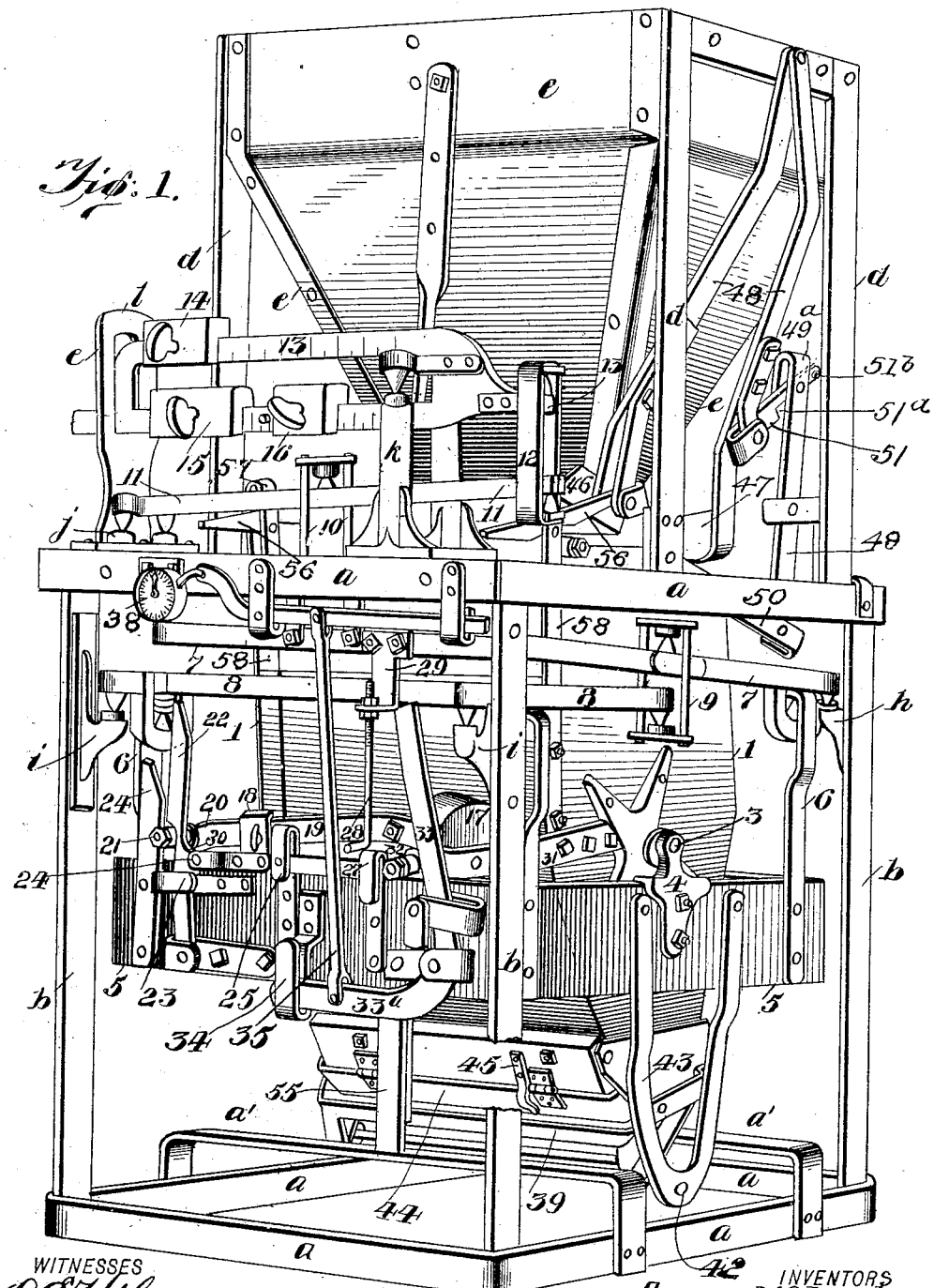
Figure 2:
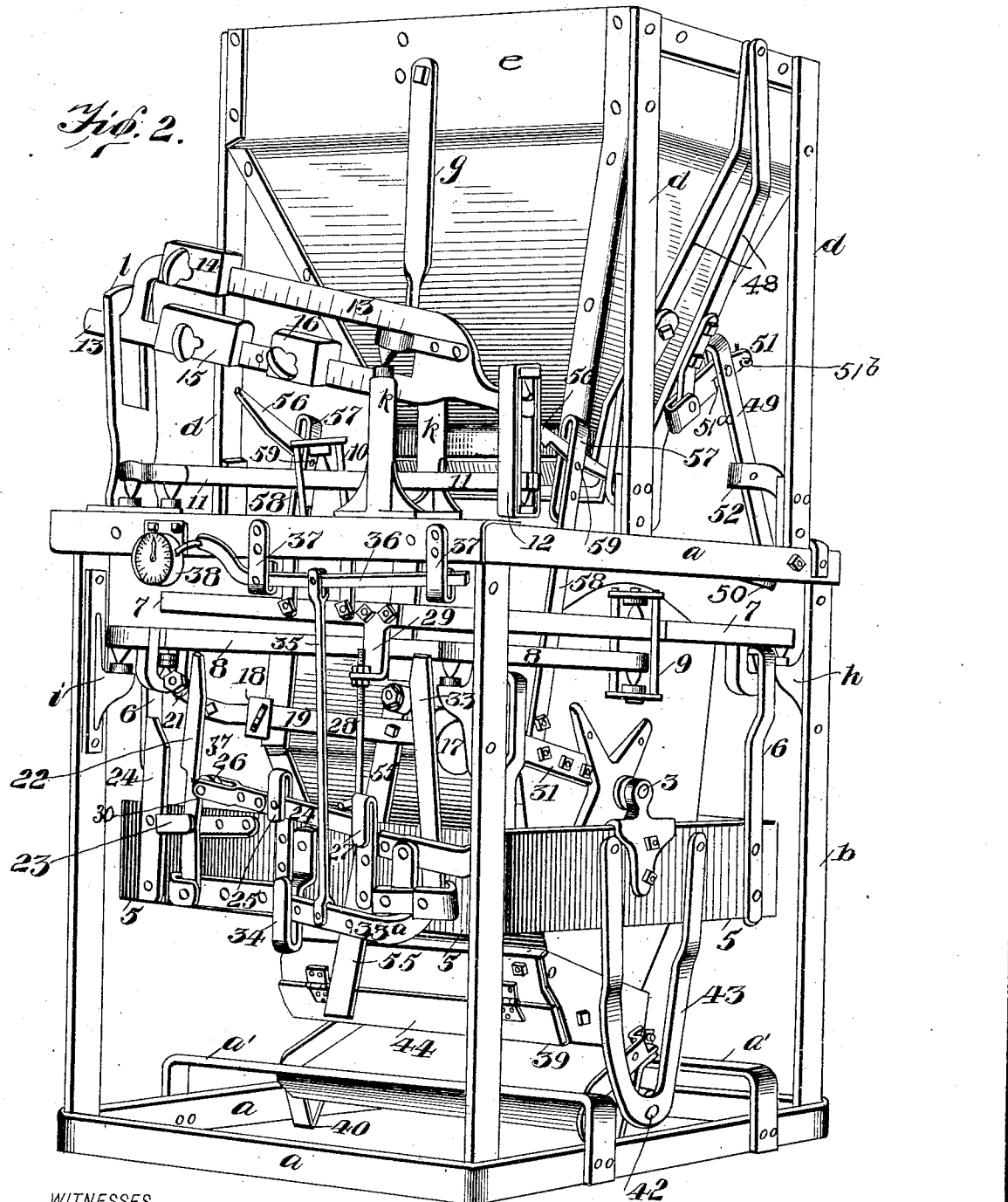
Figure 3:
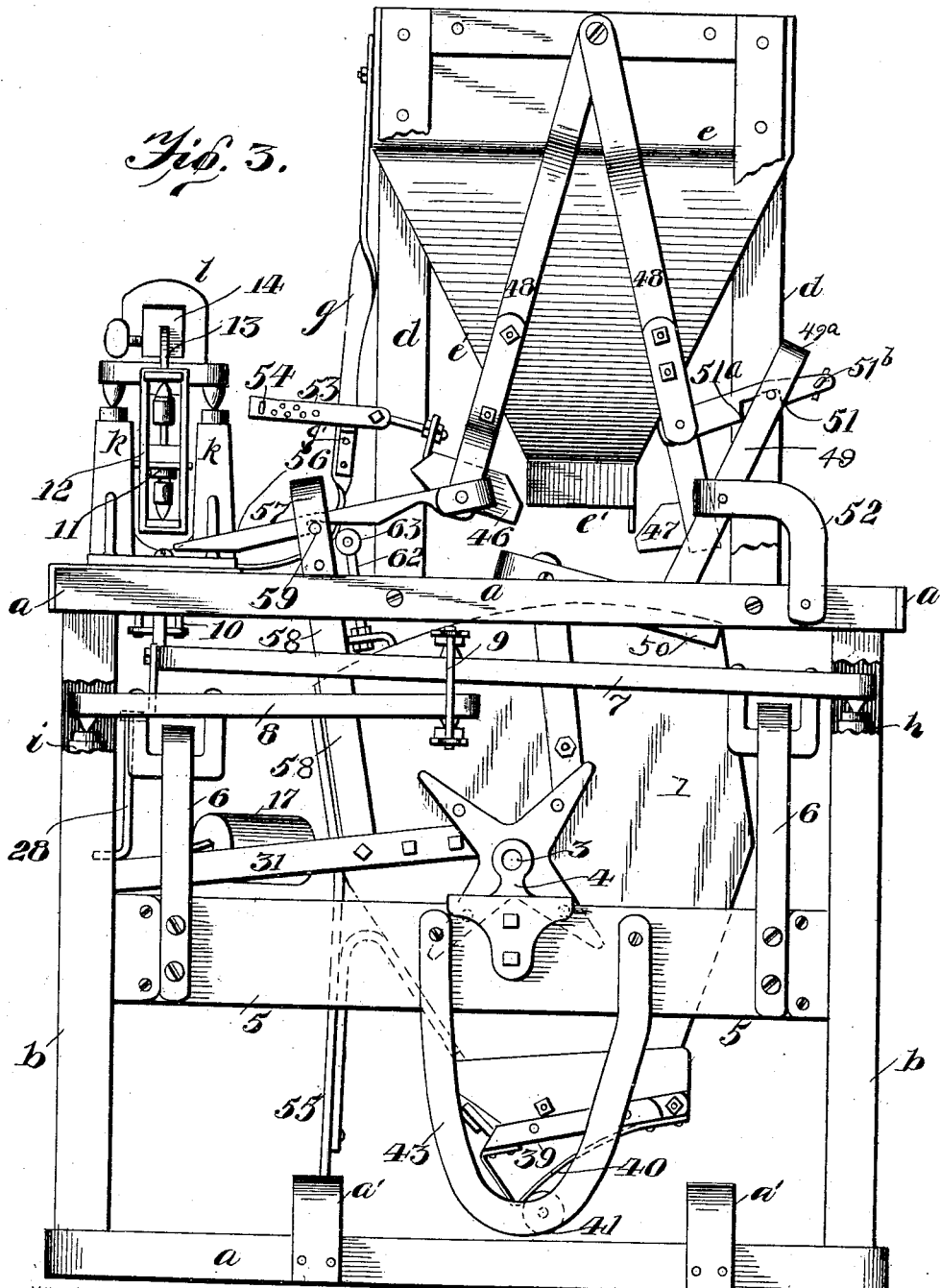
Figure 4:
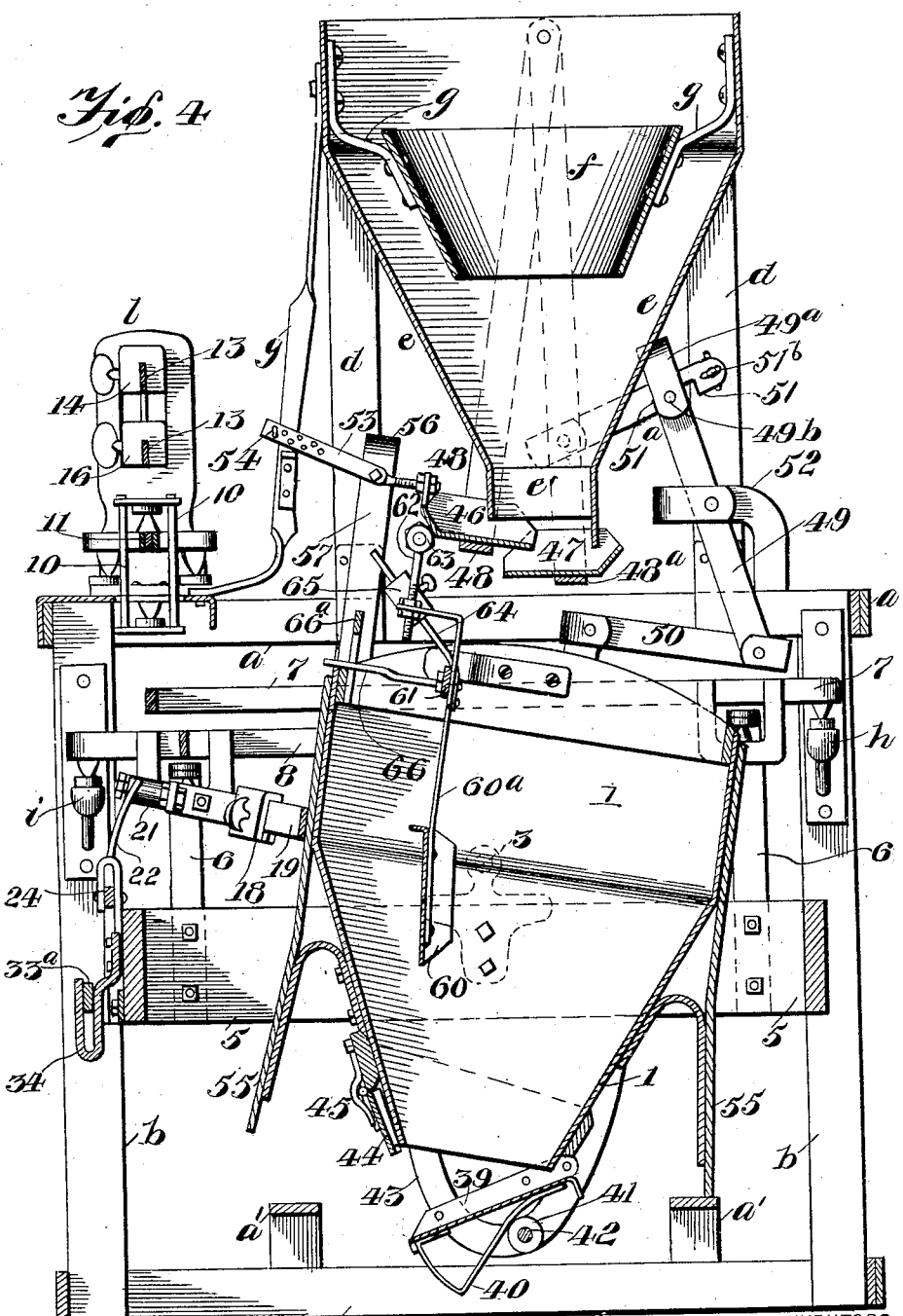
Figure 5:
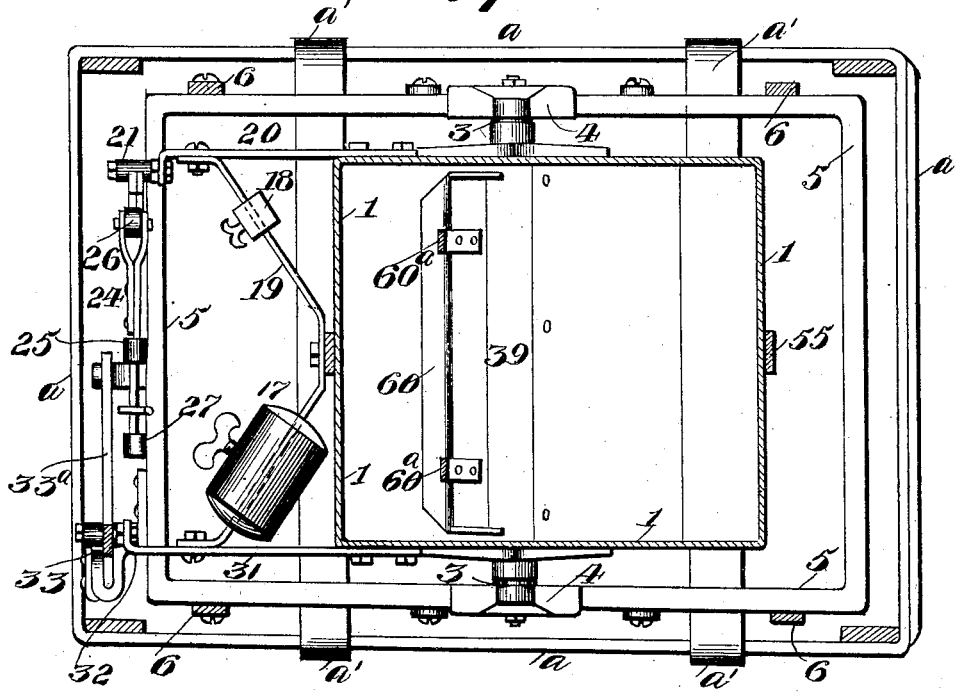
Figure 6:
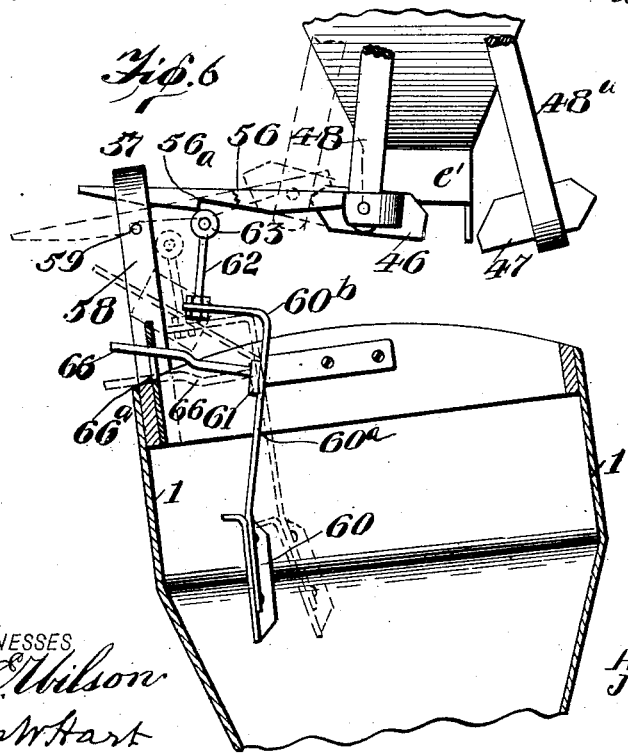

Figure 1 is a perspective view of our improved weigher, the movable parts being shown in the position they occupy when the grain-weigher is not in use or when the weighing-hopper is being filled with grain preparatory to weighing the charge. Fig. 2 is a perspective view similar to Fig. 1, save that the movable parts are in the position they occupy when the weighing-hopper has received its charge and been tilted to discharge the contents. Fig. 3 is a side view of the apparatus. Fig. 4 is a central vertical section of the apparatus, the plane of section being parallel to the side represented in Fig. 3. Fig. 5 is a horizontal section taken through the weighing-hopper at a point just above its pivots. Fig. 6 is a view showing the weighing-hopper in section and in the position it occupies when tilted to discharge its contents, together with a side view of the lower portion of the receiving-hopper and the devices for cutting off the flow of grain therefrom. Fig. 7 is a perspective view illustrating the relation of valves and their operating mechanism with the fixed and tilting hoppers. Fig. 8 is a vertical transverse section taken in a plane adjacent to the front side of the tilting hopper.

In the following description the fixed or stationary parts are indicated by lower-case letters and the movable parts by numerals, the same letters and numerals being employed so far as practicable as in our patent above referred to.

The main or base frame of the machine is rectangular and composed of horizontal top and bottom bars $a$ and four vertical bars or posts $b$. Four vertical bars or uprights $d$ are attached to the upper horizontal bars $a$ and support the grain-receiving hopper $e$. As shown in Fig 4, a smaller hopper $f$ is arranged within the receiving-hopper $e$ and supported therefrom by bars $g$. The function of the hopper $f$ is the same as that described in our former invention in that it prevents the too rapid descent of grain from a spout (not shown) into the receiving-hopper and therefrom into the weighing-hopper arranged below. In other words, it breaks the force of gravity to a certain degree by limiting or partly arresting the direct flow of the grain from the spout or chute, so that it descends more gently into the weighing-hopper 1. The latter is not pivoted centrally, as in our former invention, but eccentrically, it being provided with lateral pivots or gudgeons 3, which are journaled in ears 4, attached to the rectangular horizontal frame 5, which is preferably constructed of wooden bars. This frame is arranged within the posts or uprights $b$ and about half-way between the upper and lower bars $a$ of the main frame. It is suspended by hangers 6 from weighing-levers 7 and 8, which are pivoted, respectively, on brackets $h$ and $i$, attached to the rear and front posts $b$. The levers 7 are connected at their front ends so that they form three sides of a square. The levers 8 are similarly connected at the front; but they are shorter than the levers 7. Their inner ends are pivoted in hangers 9, that are supported on conical points provided on the central portions of the levers 7. The front bar of the lever 7 is connected by a hanger 10 with the central portion of the lever 11, having pivoted bearings at $j$ on the front upper horizontal bar $a$ of the main frame, its front end resting in a stirrup or link 12, by which it is operatively connected with the shorter member of the two-armed weighing-lever 13. The latter is pivoted above the aforesaid lever 11 on vertical supports $k$, and its free end projects through a slot in the fixed vertical guide $l$. Weights 14, 15, and 16 are applied to this lever, the weight 14 being on the upper arm and the others on the lower arm of the lever. The upper weight 14 is used for weighing, the bar on which it is adapted to slide being in practice graduated, as from "0" up to any required number of pounds. The weight 15 is for balancing. As before stated, the weighing-hopper 1 is pivoted eccentrically, and its own weight and that of the grain received by it is imposed on the rectangular frame 5, which is hung on the levers 7 and 8, and the latter are in turn connected, through the medium of a stirrup 10, Fig. 1, lever 11, and stirrup 12, with the graduated weighing-beam 13, so that when the required amount of grain has been received by said hopper the said frame and levers are depressed and the graduated beam thereby tilted or raised, as indicated in Fig. 2. The weighing-hopper is then released by mechanism which will be described and tilts or swings on its pivots to discharge its draft or load, the upper portion of the hopper moving rearward and the lower end forward. The discharging position is best indicated in Fig. 4. It is obvious that this tilting operation is due to the excess of weight of grain on the rear side of a vertical plane passing through the pivots of the hopper.

The preponderance of weight of one side of the hopper owing to the eccentric position of its pivots is counterbalanced by weights 17 and 18, (see Figs. 1, 2, 5,) which are applied to an obtuse-angle bar 19, attached to the front side of the hopper 1. By adjustment of these weights outward or inward on the bar 19—that is to say, farther from or nearer to the front of the hopper—the latter may be balanced accurately. These weights are properly adjusted at the factory. If after the hopper has discharged its draft or load it fails to return to the normal position indicated in Figs. 1 and 3, the weights should be moved farther out from the hopper. On the other hand, if the hopper restores to its normal position too soon or before the grain is all discharged the weights must be moved inward or toward the hopper. It is obvious that the larger weight 17 may be used conveniently for an approximate balancing of the hopper and the smaller weight for obtaining a finer balance.

We will now describe the means for locking and releasing the hopper automatically. An arm 20 projects forward from one side of the hopper (see Figs. 1 and 3) and is provided at its outer extremity with an antifriction-roller 21, which engages the shoulder of a latch 22, the latter being pivoted to the frame 5 and extending normal vertical. It swings in a vertical arc in a slotted guide 23. Directly opposite it on the left-hand side, Fig. 1, is fixed a vertical bar 24, and the roller or extremity 21 of the hopper-arm 20 passes between these as the hopper oscillates backward and forward. A locking-lever 24 is pivoted at 25 to the frame 5 and arranged horizontally, one end being weighted and provided with an antifriction-roller 26, which works in contact with the locking device or latch 22. The other end of the said lever 24 works in a guide 27, this being fixed to the front of the frame 5. A rod 28 (see Figs. 1 and 2) is pendent from a bracket 29, attached to the front of the weighing-levers 27, and its lower end is bent at a right angle to adapt it to strike upon the right-hand end of the locking-lever 26 when the weighing-lever 7 is depressed, as occurs when the hopper is filled to the required extent. In other words, the rod 28 descends and depresses the adjacent end of the locking-lever 24 each time the hopper is filled and discharged. When the lever 24 is thus depressed, its weighted end 26 is raised, as shown in Fig. 2, and in so doing the roller passes over a shoulder 30, formed on the adjacent side of the latch 22, which allows the latch to fall back sufficiently to release the roller or end 21 of the hopper-arm 20, thus permitting the hopper to tilt from the position indicated in Figs. 1 and 3 to that indicated in Figs. 2 and 4. When the draft or load in the hopper is discharged, the weights 17 and 18 tilt it back to its former normal position and the arm 20 becomes again engaged with the latch 22 and the weighted end 26 of the locking-lever 24 passes down below the shoulder 30, so that the latch will be held securely in a locked position until the hopper shall again fill and the weighing-lever 7 be again depressed, thus carrying down the arm 28 again into contact with the locking-lever 24. It will be noted (see Figs. 1 and 2) that the upper end of the arm 28 is screw-threaded and that it is secured to the bracket 29 by jam-nuts. Consequently the arm 28 may be adjusted higher or lower as required to cause it to act upon the locking-lever 28 at precisely the right juncture.

We provide an apparatus for registering the amount of grain weighed whose operation is effected as follows: Opposite the arm 20 of the hopper—that is to say, attached to the opposite side of the latter—is a corresponding arm 31, that projects forward and is similarly provided with a roller 32, which is adapted to work in contact with the arm or member 33 of the elbow-lever that is pivoted to the front of the frame 5 and whose horizontal arm 33ª works in a slotted guide 34 and is connected by a rod 35 with a lever 36, (see Figs. 1 and 2,) which is pivoted in hangers 37, attached to the front upper bar a of the main frame and is suitably connected with a register 38. It will be noted in Figs. 1 and 2 that the arm or member 33 of the elbow-lever is inclined inward or away from the adjacent vertical post b, so that when the hopper 1 tilts the rollers 32 on the hopper-arm 31 will work in contact with the adjacent side of the member 33 and owing to the inclination of the latter tilt the lever on its pivot from the position shown in Fig. 1 into the position shown in Fig. 2. By this means the rod 35 is caused to raise the right-hand end of the register-lever 36, or, in other words, tilt the latter on its pivot, whereby the operation of the register is effected automatically. When the hopper 1 is restored from the discharging position, Figs. 2 and 4, to the normal position, Figs. 1 and 3, the levers 33 33ª and register-lever 36 also resume their normal position by the influence of gravity. Thus whenever the hopper is tilted for discharging its load the registering apparatus is also operated automatically.

As shown in Figs. 1, 3, 4, the bottom of the weighing-hopper 1 is formed by a device which may be termed a "valve" 39, the same consisting of a metal plate having side flanges that are pivoted at the rear side of the hopper-mouth. The under side of this valve 39 is provided with an angular bracket 40, which is inclined downward from the rear side of the valve to the front and rests always in contact with the support in the form of a roller 41, that is journaled on a rod 42, whose ends are secured in U-shape brackets 43, the same being attached to and pendent from the sides of the frame 5. As the hopper oscillates in the operation of filling and discharging the bracket or support 40 of the valve 39 rises on the roller 41, and owing to the change of position from the vertical to the discharging position the hopper-mouth is opened and closed automatically. Thus in Figs. 1 and 3 the forward end of the bracket or support 40 is shown resting upon the roller 41 and the valve 39 is closed, whereas when the hopper tilts to discharge the bracket 41 runs forward on the roller, which thus approaches nearer the valve, and consequently allows the latter to open. It will be understood that in practice the base of the main frame of the machine will be supported upon legs or by other means and that the discharge from the hopper will be received into a chute, bin, or any other form of receptacle, according to conditions.

As in our former invention, the limits of oscillation of the hopper are determined by means of stops 55, (see Fig. 4,) which strike upon fixed portions a' of the main frame. To the front side of the hopper 1, adjacent to its mouth, we hinge a flap-valve 44, it being of the same length as the width of the hopper, as indicated in Figs. 1 and 2. This valve extends a little below the adjacent edge of the hopper-mouth, and when the hopper tilts back to its normal position the lower edge of the valve 44 strikes and slides inward upon the valve 39, which facilitates closing the mouth securely. The valve 44 prevents leakage, which might occur if the valve 39 should not close tightly, as in case the latter should not be pressed up close to the hopper-mouth from any cause—for example, by reason of an obstruction, such as a piece of corncob, coming between the valve 39 and the mouth of the hopper. The outward movement of the valve 44 is limited by stops in the nature of curved arms 45, which are secured above its hinge and whose free ends extend over the valve.

The discharge of grain from the fixed hopper e into the receiving-hopper 1 is regulated by mechanism now to be described, the same consisting, chiefly, of two valves 46 47. Both the valves are practically in the nature of extended pans or troughs with their adjacent inner sides removed. Both are suspended in hangers 48, which are pivoted to the upper end of the fixed receiving-hopper e so that the valves are adapted to swing beneath the mouth e' of the said hopper. The valve 46 is arranged above the plane of the other so that they may be closed together shear like. In practice the front valve 46 is released a few seconds before the weighing-beam tilts and at its rotation discharges to the receiving-hopper in a small uniform stream. Hence this valve is called the "regulating-valve." The other valve 47 is closed by gravity when the hopper tilts, and it cuts off the feed or discharge entirely, it being hence called the "cut-off valve." As shown, (see Figs. 3 and 4,) the positive retraction of the cut-off valve is provided for by a lever 49 and links or bars 50 51, that connect the respective ends of said lever with the weighing-hopper 1 and the hanger 48 of valve 47. The lever 49 is pivoted in a bracket 52, attached to the upper portion of the main frame a, and it is arranged in vertical position. Its upper end is slotted or looped at 49ª, in which the link 51 is adapted to slide. The latter is cut out to form an elongated notch or recess 51ª, (see Figs. 4 and 7,) and a pin 49ᵇ in the lever 49 works in this notch 51ª. A cotter-pin 51ᵇ may be inserted in the outer end of link 51 to prevent the loop 49ª of lever 49 slipping accidentally off the link. It is apparent that the cut-off valve 47 will be retracted positively only when the pin 49ᵇ strikes the outer shoulder of the notch 51ª. Thus the valve 47 may be fully closed by gravity when the weighing-hopper tilts, as in Fig. 4, and the pin 41ᵇ is then allowed freedom of movement in the notch 51ª; but when the weighing-hopper 1 moves back to its normal position, Figs. 1 and 3, the pin 49ᵇ strikes the outer shoulder of the bar 51, and thus turns back or retracts the valve 47 to the position indicated in Fig. 3. To the regulating-valve 46 is attached a device that serves to regulate its position in certain cases as required to suit the handling capacity of the elevator. This consists of a bar having perforations to receive a pin 54 and formed of parallel parts separated far enough to allow it to slide freely on a fixed bar g, (see Fig. 4,) whose upper end is attached to the front of the receiving-hopper *e* and its lower end to a plate secured on the frame *a*. A stop or bracket *g'* on bar *g* supports the adjusting device 53. There is a screw connection between this device and the valve 46, as shown. There are several holes in the valve-regulating device 53, and the pin 54 is placed in any manner that may be required to stop or arrest the inward movement of the valve 46. The adjustment of the pin 54 is according to the kind of grain which is being weighed. To weigh wheat, rye, &c., the pin is placed in the outer hole, and for corn in the second hole, and for oats in the third hole. Thus the adjustment of the cotter-pin 54 will always be according to the kind of grain being weighed. Latches or latch-bars 56 (see Figs. 6 and 7) are pivoted to the lower ends of the hangers 48, which suspend the regulating-valve 46, and they extend forward through guide-loops 57, formed at the upper ends of bars 58, that are attached rigidly to the front upper corners of the weighing-hopper 1. A pin 59 is inserted through the lower portion of the loop, and each of the latch-bars 56 is provided with a shoulder 56$^a$ for engaging the pin, on which it normally rests and slides.

Means are provided for releasing the latches automatically from the pins; but they are normally engaged with them when the hopper swings back from the discharging position, whereby the regulating-valve 46 is thrown back from the mouth of the receiving-hopper into the position indicated in Figs. 1 and 3. It is apparent that if the latches be raised they will be disengaged from the pin 59 and that the regulating-valve 46 may then swing forward automatically by the effect of gravity, which is the operation desired in the primary operation of closing the hopper. Obviously the pin 54 in the adjusting device 53 will stop the swinging closing movement of the regulating-valve 46 at the right point. The means for automatically releasing the latches 56 from the pins 59 is a plate 60, suspended within the weighing-hopper 1, the same being attached to the arms 60$^a$, that are pendent from the cross-bar 61, whose ends are pivoted in brackets on the side of the hopper. It is provided with arms 60$^b$, are bent rearwardly or at a right angle, and to them are attached screw-threaded rods 62, the same being secured by nuts, so that they may be adjusted higher or lower. The upper ends of these adjustable rods 62 are bent laterally and provided with antifriction-rollers 63. An arm 64, provided with a sliding weight 65, is attached to the pivoted bar of the plate or "paddle" 60 and extends at a lateral inclination toward the front of the machine, thus serving to hold the plate 60 in its normal position. (Indicated by dotted lines, Fig. 6.) As the grain fills the weighing-hopper 1 the plate or paddle 60 is gradually pressed backward from the position indicated in dotted lines, Fig. 6, to the position shown by full lines, and the rollers on rods 62 are thus caused to press upward against the latches 56 and release them from engagement with the pins 59, so that the regulating-valve 46 may move or swing inward by gravity, so as to partly close the mouth of the hopper *e*. The movement of the plate or paddle 60 is limited by the rigid lateral arm 66, that works in a slotted guide 66$^a$, attached to the upper portion of the hopper. The plate or paddle 60 should be so adjusted by the adjustment of the weight and the rods 62 as to release the regulating-valve 46 three or four seconds before the weighing-beam 13 tilts. If it be found that the regulating-valve 46 is not released soon enough, the paddle should be lowered. If it is released too soon, the paddle should be raised. The apparatus will not weigh accurately unless the regulating-valve 46 is released before the weighing-beam tilts. Hence it is important that the adjustments should be properly made before testing the weights. It will be understood that the weight 65, connected with the paddle, only serves to restore it to position and hold it in normal position. After the paddle is lowered it may be necessary to move it out on the bar to restore it to position. The proper adjustments will be made at the factory, and it is not probable that readjustment will be necessary.

It will be seen that while the regulating-valve 46 is automatically released before the hopper tilts, and thus swings to position beneath the receiving-hopper *e* by the tilting or rearward movement of the upper portion of the weighing-hopper 1, the arms 58 are carried back and the pins 59 become reëngaged with the shoulders 56$^a$ of the latch-bars 56, so that when the hopper swings back to its normal position in Figs. 1, 3, the valve 46 is drawn back and held in its retracted position until the weighing-hopper again fills and the paddle 60 is again tilted to cause automatic release of the latches 56, as before described.

Preparatory to using the machine it, or more particularly the weighing-hopper 1, requires to be balanced. It is obvious that this must be done while no part of the hopper touches or rests upon the main frame. In other words, the pendent bars 55 must not at any time be in contact with the cross-bars *a'*. Consequently the hopper is turned until the stops 55 are clear of the bars *a'*. The hopper is then propped by any suitable means to temporarily hold it so that there is a clearance between the stops 55 and the bars below. Then the weighing-weight 14 is set to the right on the graduated beam 13 as far as it will go and is secured by its thumb-screw. Next the regulating-weight 15 is set against the pin which is on the lower member of the weighing-beam. Then move the balance-weight 16 until the beam will move slightly from the bottom of the slotted guide $l$. The scale is thus balanced. Let it now be supposed that grain is to be weighed in drafts or charges of two hundred pounds. The weighing-weight 14 is set at two hundred pounds on the beam 13 and grain is run into the hopper. When the beam tilts at two hundred pounds, the load in the hopper may weigh two hundred and five or two hundred and six pounds. In other words, the weighing-beam tilted when there was a pressure of two hundred pounds in the weighing-hopper and the cut-off valve 47 interrupted the stream of grain at the same time; but there was a part of the stream in the air between the grain that was actually weighed and said cut-off valve, which portion of grain was discharged into the hopper 1, and thus mingled with the grain actually weighed. This will explain why the regulating-weight 16 is required. The overweight above referred to is corrected by moving this regulating-weight away from the pin a distance required to indicate five pounds. The beam 13 will then tilt when one hundred and ninety-five pounds are in the hopper, and the five-pound suspended stream will make it two hundred pounds, as indicated on the beam. When the load in the hopper weighs less than indicated on the beam 13, correction can be made by moving the regulating-weight 16 toward the pin, and if the load is more or too heavy the weight is moved away from the pin. It will be understood that the lower part of the beam is graduated to indicate pounds.

We claim—

1. In a weighing-machine, the combination with a weighing-beam, weighing-levers operatively connected therewith, and a hanging support, of a hopper which is pivoted eccentrically on such support and provided with a forwardly-extending arm, mechanism for engaging and locking said arm, and means operatively connected with the weighing-levers for releasing such mechanism and allowing the hopper to tilt when a load of the required weight has been received, substantially as described.

2. In a weighing-machine, the combination with weighing mechanism and a support connected therewith, of a weighing-hopper pivoted eccentrically on said support and having a bottom-closure consisting of a plate hinged at one side and provided with an arm inclined downward from the hinged side of the valve, and a support on which it is adapted to slide, the same consisting of a hanger pendent from the hopper-support and a shaft and a roller journaled thereon, the arrangement being such that when the hopper is in the normal receiving position the valve is closed, but upon receiving a load and tilting backward the inclined arm slides forward on its support and thus allows the valve to open for discharging, as described.

3. In a weighing-machine, the combination with weighing mechanism, and a hopper-support pendent therefrom, of a weighing-hopper pivoted on said support and provided with a bottom valve which is hinged at one side, a support for said valve by which it is closed when the hopper is in normal position and allowed to open automatically when the hopper tilts, a guard-valve hinged on the opposite side of the hopper, and means for holding it in position to strike and slide upon the discharge-valve when the hopper tilts back to its normal position, substantially as described.

4. In a weighing-machine, the combination with weighing mechanism proper including pivoted levers and a frame suspended therefrom, of a weighing-hopper pivoted on such frame and having a forwardly-extended arm and a pivoted latch for engaging the same, and a device for locking the latch in position to lock the arm so that the hopper is prevented from tilting until the required load has been received, and a trip device connected with the weighing mechanism for tilting the aforesaid device and thereby releasing the latch, substantially as described.

5. In a weighing-machine, the combination with weighing mechanism and a hopper-support operatively connected therewith, of a weighing-hopper pivoted on said support and having a forwardly-extended arm, a latch pivoted and arranged vertically and provided on one side with a shoulder for engaging said arm and on the opposite side with another shoulder, a locking device consisting of a bar pivoted on the hopper-support and weighted at one end and adapted for sliding contact with the adjacent shouldered portion of the latch, and a trip device connected with and pendent from the weighing-levers, whereby, when the latter are depressed by the load in the hopper, the said device is tilted and releases the locking-latch, substantially as described.

6. In a weighing-machine, the combination with weighing mechanism proper and a support pendent therefrom, of a hopper pivoted eccentrically on said support and provided with a forwardly-extending arm, a pivoted latch for engaging said arm, a device which holds said latch normally engaged with the arm, and a trip pendent from the weighing mechanism and adapted, when the required load is in the hopper and the levers are depressed, to release the latch, substantially as described.

7. In a weighing-machine, the combination with weighing mechanism and a hopper-support pendent therefrom, of a weighing-hopper pivoted on said support and provided with a forwardly-extended arm, an elbow-lever pivoted on the hopper-support and arranged with its upper member inclined to a vertical plane in which the extremity of said arm moves as the hopper tilts, a register, and mechanism operatively connecting it with the horizontal member of said lever, whereby the register is operated automatically when the hopper tilts and the elbow-lever is automatically restored to normal position with the hopper, substantially as described.

8. In a weighing-machine, the combination with a fixed receiving-hopper and a pivoted weighing-hopper arranged below it, of a valve for regulating the flow of grain from the fixed hopper into the pivoted hopper, the same being provided with swinging supports, latches pivoted thereto, arms extending upward from the front side of the tiltable hopper and provided with means for engaging said latches, and means connected with the pivoted hopper for automatically releasing the latches and thus allowing the valve to swing beneath the receiving-hopper and arrest the flow of grain in part, substantially as described.

9. In a weighing-machine, the combination with a fixed receiving-hopper and a pivoted weighing-hopper arranged below it, of a valve for regulating the flow of grain from the fixed hopper into the pivoted hopper, the same being provided with swinging supports, latches pivoted thereto, arms extending upward from the front side of the tiltable hopper and provided with means for engaging said latches, means connected with the pivoted hopper for automatically releasing the latches and thus allowing the valves to swing beneath the receiving-hopper and arrest the flow of grain in part, and a second valve having a swinging support, and means operatively connecting it with the pivoted hopper, whereby, when the latter tilts, the last-named valve is released and allowed to swing forward to entirely cut off the flow of grain, substantially as described.

10. In a weighing-machine, the combination with a pivoted tiltable weighing-hopper and a receiving-hopper adapted to discharge thereinto, of a valve having a swinging support, means connected with the tilting hopper for retracting it, and other means arranged within the said hopper and serving, when the latter has filled to a certain degree, to automatically release the valve whereby it is allowed to swing beneath the receiving-hopper and partly arrest the flow of grain before the weighing-hopper tilts, and a cut-off valve arranged opposite the first-named valve, means for suspending it whereby it is adapted to swing beneath the receiving-hopper, and link-and-lever mechanism operatively connected with the tilting hopper whereby it is positively retracted when the latter swings to normal position and is automatically released when the same is tilted by its received load, substantially as described.

11. In a weighing-machine, the combination with a weighing-hopper pivoted and adapted to tilt, of a receiving-hopper arranged above it, a cut-off valve and a swinging support therefor whereby it is adapted to pass beneath the fixed hopper, a lever pivoted on the main frame of the machine, a link connecting it with the tilting hopper, and a second link pivoted to the valve-hanger and connected at its outer end with the aforesaid lever, the link being provided with a notch and the lever with a pin for engaging the outer shoulder of the same, whereby, when the hopper is tilted, the valve is released to swing to closing position by gravity but is positively retracted by the lever when the hopper tilts back to normal position, substantially as described.

12. In a weighing-machine, the combination with a pivoted tilting hopper and a receiving-hopper arranged above it, of a valve and a hanger therefor arranged so that the valve is adapted to swing beneath the hopper, means connected with the weighing-hopper for retracting the valve when the hopper tilts to normal position, and a device arranged within the weighing-hopper and pivoted, and provided with means for releasing the aforesaid valve when pressed backward by the grain accumulated in the weighing-hopper, substantially as described.

13. In a weighing-machine, the combination with a pivoted tiltable weighing-hopper and a fixed hopper for discharging thereinto, of a movable valve for regulating the flow of grain from the fixed hopper, and a movable device arranged within the weighing-hopper and operatively connected with the said valve, whereby the latter is automatically released when the weight and pressure of the grain within the weighing-hopper reaches a certain maximum, substantially as described.

14. In a weighing-machine, the combination with a pivoted tiltable weighing-hopper and a receiving-hopper arranged above it, of a valve for regulating the flow of grain from the latter, said valve being supported and adapted to move from the normal retracted position to a position beneath the hopper, latches pivoted to the valve and arms attached to the weighing-hopper and having parts that engage the latches, a movable device arranged within the hopper in position to be acted upon by the pressure of the grain accumulated therein, and devices connected therewith and extending upward in position for contact with said latches, whereby, as the device within the hopper is tilted, the latches are released automatically and the valve thereby allowed to move to closing position before the weighing-hopper tilts, substantially as described.

15. In a weighing-machine, the combination with a pivoted, tiltable, weighing-hopper and a receiving-hopper adapted to discharge thereinto, of a valve which is movably connected with the fixed hopper for regulating the flow of grain therefrom, latch mechanism which operatively connects such valve with the weighing-hopper, and a plate pivoted within the latter and counterweighted for holding it in a certain normal position, and devices connected with the plate and extended upward whereby when a certain amount of grain has accumulated within the weighing-hopper the latch mechanism is automatically operated to release the regulating-valve, substantially as described.

16. In a weighing-machine, the combination with a pivoted tilting weighing-hopper and a fixed hopper adapted to discharge thereinto, of a valve having a swinging support and adapted to partially cut off the flow of grain from the fixed hopper, latches pivotally connected with the valve and arms attached to the weighing-hopper which are engaged by the latches so that the valve is retracted when the weighing-hopper tilts back to its normal receiving position, a plate supported within the weighing-hopper and pivoted to the latter, vertically-adjustable rods connected with the pivotal support of said plate and extending upward so that they are adapted for contact with the latches when swung backward by the forward movement of said plate due to pressure of grain in the weighing-hopper, whereby the latches are raised and automatically released to allow the valve to close automatically, as described.

17. In a weighing-machine, the combination with a tilting weighing-hopper and a fixed hopper arranged to discharge thereinto, of a valve for regulating the flow of grain from the fixed hopper, latch mechanism operatively connecting the valve with the weighing-hopper, whereby the former is retracted when the hopper swings to its normal position, said mechanism being adapted to be released automatically to allow the valve to swing to the closing position, a plate pivoted within the weighing-hopper and counterbalanced as described, a rigid arm projecting from and pivoted to said plate, a stop for limiting its movement, and devices connected with the plate and extending upward and adapted to operate the latch mechanism automatically and thus release the valve when a due weight and pressure of grain have accumulated in the weighing-hopper, substantially as described.

ANGUS McLEOD.
JOHN H. McLEOD.

Witnesses:
 CHARLES NADLER,
 GEORGE BEYER.